United States Patent [19]
Duggan

[11] Patent Number: 6,026,545
[45] Date of Patent: Feb. 22, 2000

[54] UNIVERSAL RESTRAINT CLIP FITTING

[75] Inventor: Daniel Duggan, St. Louis, Mo.

[73] Assignee: Loos & Co., Inc., Naples, Fla.

[21] Appl. No.: 09/286,723

[22] Filed: Apr. 6, 1999

[51] Int. Cl.[7] .............................. E65D 5/00; A47F 5/00; F16G 11/00
[52] U.S. Cl. .................................. 24/265 AL; 24/129 R; 24/129 B; 24/701; 248/300
[58] Field of Search ............... 24/265 AL, 666, 24/701, 129 B, 129 C, 129 D, 129 R, 18, 16 R, 135 R; 248/300, 499; 411/400

[56] References Cited

U.S. PATENT DOCUMENTS

| | | | |
|---|---|---|---|
| 912,387 | 2/1909 | Landry | 24/129 R |
| 1,380,518 | 6/1921 | Bellig | 248/300 |
| 3,238,585 | 3/1966 | Froyd | 24/129 B |
| 3,930,288 | 1/1976 | Black et al. | 24/129 R |
| 4,040,589 | 8/1977 | McLay | 248/300 |
| 4,630,982 | 12/1986 | Fenner | 24/701 |
| 4,676,470 | 6/1987 | Okura | 248/499 |
| 5,224,246 | 7/1993 | Royball | 24/129 B |
| 5,412,843 | 5/1995 | Krongauz et al. | 248/300 |

*Primary Examiner*—Victor N. Sakran
*Attorney, Agent, or Firm*—R. William Reinsmith; Murtha, Cullina, Richter and Pinney LLP

[57] ABSTRACT

A universal one piece restraint bracket particularly suited for use with wire rope or cable for transverse, longitudinal and combined transverse and longitudinal seismic bracing systems for supporting an object. The bracket is generally L shaped to define a flattened apertured central portion with two wing portions generally at right angles to each other, apertured at their free ends and joined to the flattened central portion, each wing being elevated or upwardly bent away from the plane of the central portion. Aircraft type cables or wire rope connect the bracket to an adjacent support structure with the central portion of the bracket being secured to an object to be supported, whereby the bracing system acts in tension only so as to dampen earthquake loads and forces and thus is not subject to compression loads. A single bracket accommodates a wide variety of seismic bracing, and the bracket is configured for stacking with another bracket where necessary.

3 Claims, 6 Drawing Sheets

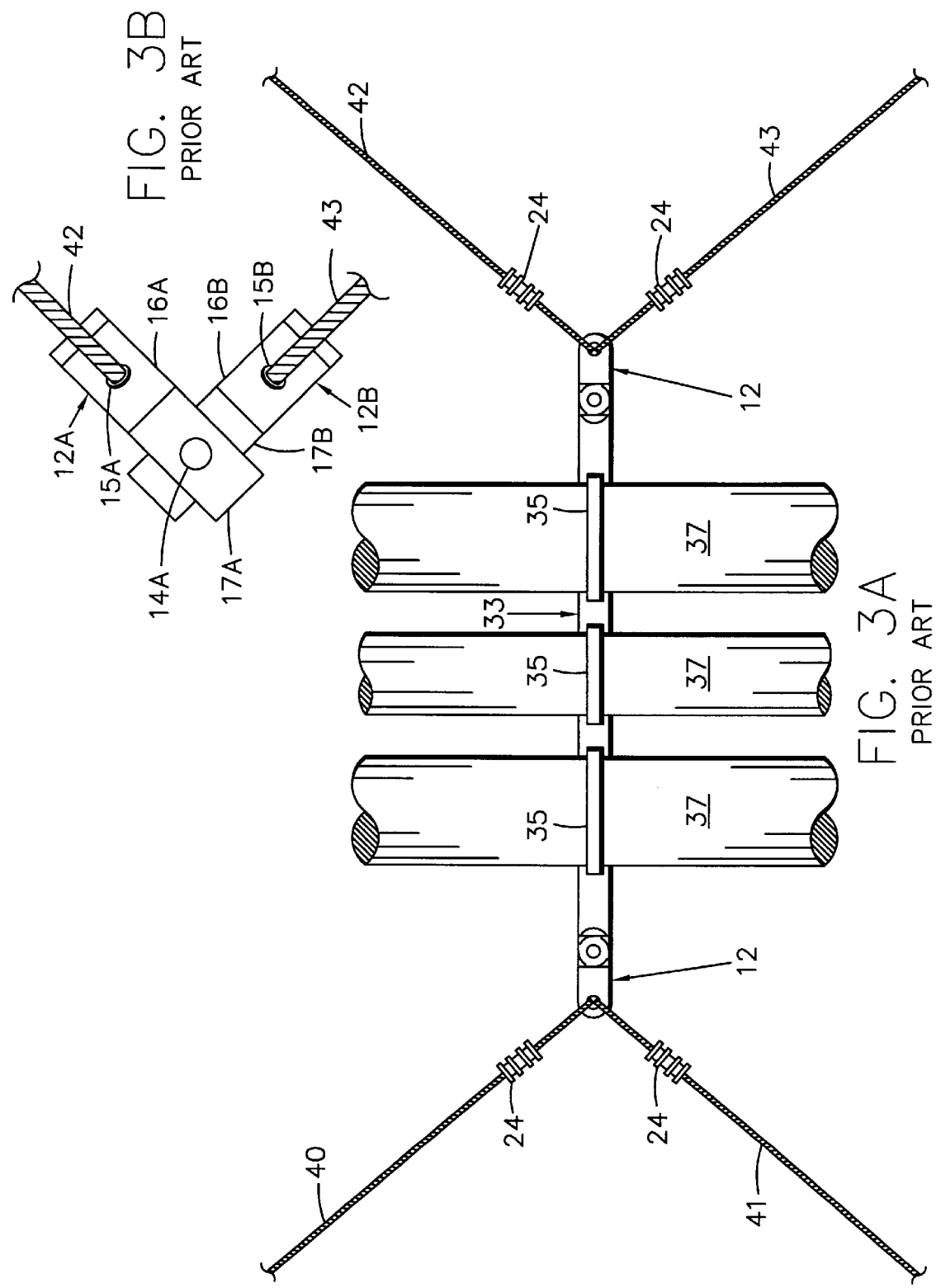

UNIVERSAL RESTRAINT CLIP FITTING

FIELD OF THE INVENTION

This invention relates to bracing of piping, ductwork and other structural features of buildings and is more particularly directed to apparatus intended primarily for use with tensioned cable sway control systems through use of a single configuration bracket which can be effectively and economically used with a variety of objects to be braced in a variety of cable systems, particularly those providing lateral, longitudinal and four-way sway bracing systems. The invention finds significant usage in bracing structural elements to control seismic induced object sway in earthquake conditions.

PRIOR ART

Because of the random occurrence of seismic shock waves (earthquakes) and the resulting high damage to property and life, Congress enacted Public Law 95-124 known as the Earthquake Hazards Reduction Act, which act has been amended and made the subject of presidential executive orders. A federal government interagency committee on seismic security in construction has been establishing standards not only for the retrofitting of existing buildings but also standards for new construction intended to reduce damage in the event of an earthquake to the components of life safety systems such as sprinkler systems, electrical distributions systems, piping for various purposes and in general to develop seismic restraint requirements for use by architects, engineers and seismologists.

It has been determined that using cables in tension to dampen loads and to reduce sway of the object being stabilized, whether that device is piping, HVAC duct, ceiling grids, electrical conduit or other building elements, is more effective than use of compression braces which introduce radius of gyration limitations that reduce damping of loads and often lead to compression brace buckling failure.

Bracing techniques using cables are known and generally fall into either the 2-way brace to restrain object movement in a single direction or the 4-way brace to restrain both lateral and longitudinal object movement. Such techniques (whether 2-way or 4-way) generally comprise a plurality of cables of the appropriate length suitably affixed at one end to the support structure and the other end suitably affixed to the object to be restrained. Brackets have been devised for attachment to the cable ends to expedite connection of the cable ends to a support surface and to the object. Conventional techniques for securing such brackets to the support surface have been used.

Whether working on new construction or retrofitting old construction, installers have generally been required to carry a wide variety of bracket configurations and sizes to accommodate the number of cables used to effect the desired type of bracing. Moreover, attempts to secure a plurality of brackets with a single fastener to the stabilized object or to the support surface have, on occasion, created excessive bending moments and loads upon the single fastener, often producing shear forces at the fastener.

OBJECTS OF THE INVENTION

It is a primary object of this invention to provide a universal restraint bracket having a structure and configuration that makes it suitable for simplified use in a cable tension system for dampening and sway reduction under seismic load conditions.

It is a further object of this invention to provide a restraint bracket or clip suitable for securement to a structural element such as a building wall or ceiling, to objects such as water pipes, electrical conduit, HVAC systems as well as their conventional supports and other apparatus used within the building to facilitate attachment of a cable system to dampen seismic shock induced apparatus sway.

It is an additional object of the invention to provide a restraint bracket for economical use in tensioned cable systems suitable for use with a single cable or a larger number of cables as the user may prefer.

It is yet another object of this invention to provide an easily manufactured universal restraint clip or bracket useable in the facile attachment of cables to a wide variety of objects, the clip being suitable for nesting to expand the cable attachment opportunities.

Other objects will be in part obvious and in part pointed out more in detail hereinafter.

SUMMARY OF THE INVENTION

The foregoing objects as well as other objects are achieved by this invention through utilization of a universal one piece restraint bracket which is particularly suited for use with wire rope seismic bracing systems. The universal bracket can be characterized as being generally L-shaped in top plan view to define a flattened apertured central portion with two wing portions arranged generally at right angles to each other and apertured at their free ends as well as being joined to the flattened central portion. Each such wing is upwardly bent away from the plane of the flattened central portion. The flattened centrally apertured portion can be affixed to either a supporting structure or to the device which is to be subjected to dampening forces in the event of forces such seismic loads; the brackets may be identical as the user may desire and can be sized depending upon the nature of the apparatus to be stabilized.

A better understanding of the objects, advantages, features, properties and relations of the invention will be obtained from the following detailed description and accompanying drawings which set forth certain illustrative embodiments and are indicative of the various ways in which the principles of the invention are employed.

BRIEF DESCRIPTION OF THE DRAWINGS

FIG. 3A is a top plan view of the assembly, partly broken away, of FIG. 3 wherein lateral and longitudinal sway protection is achieved by cables arranged in a general V shape and attached to a single bracket on each end of the hanger;

FIB. 3B is a top plan view of a prior art showing of a pair of single brackets in a stacked arrangement and which can be used in the assemblies of FIGS. 2, 2A, 3 and 3A.

Figure 4:
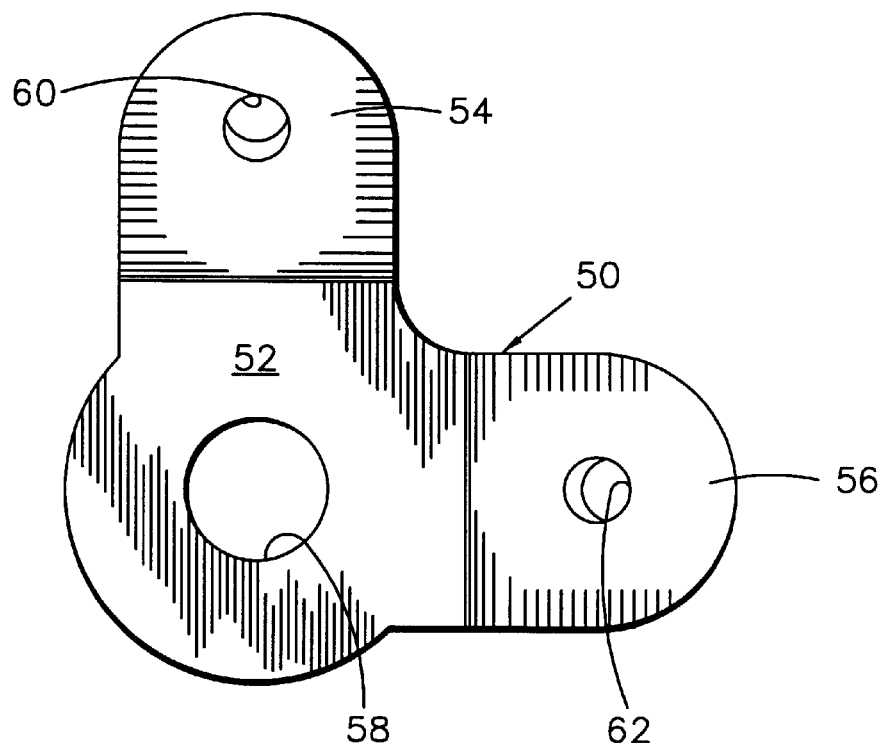
Figure 5:
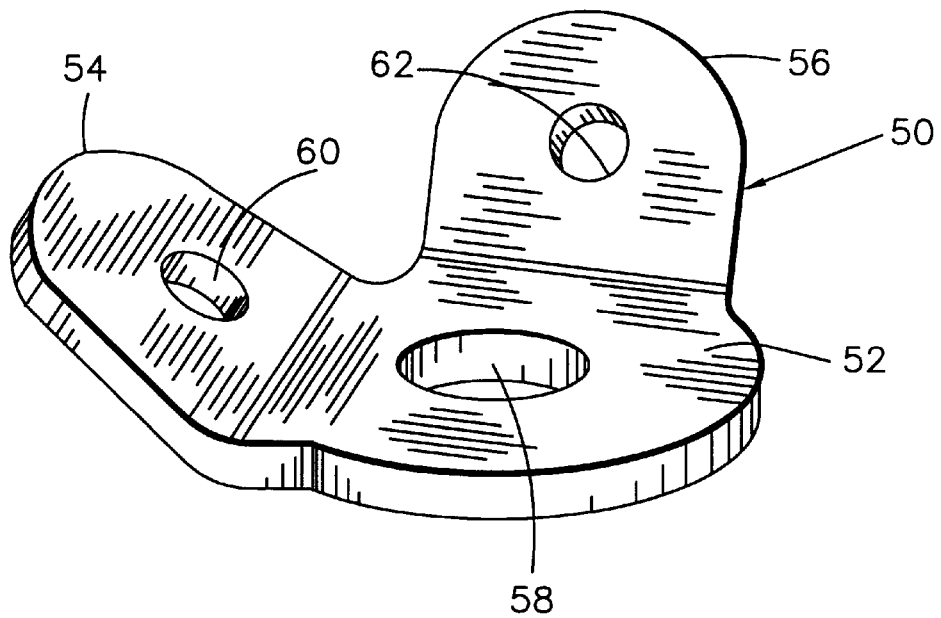
Figure 6:
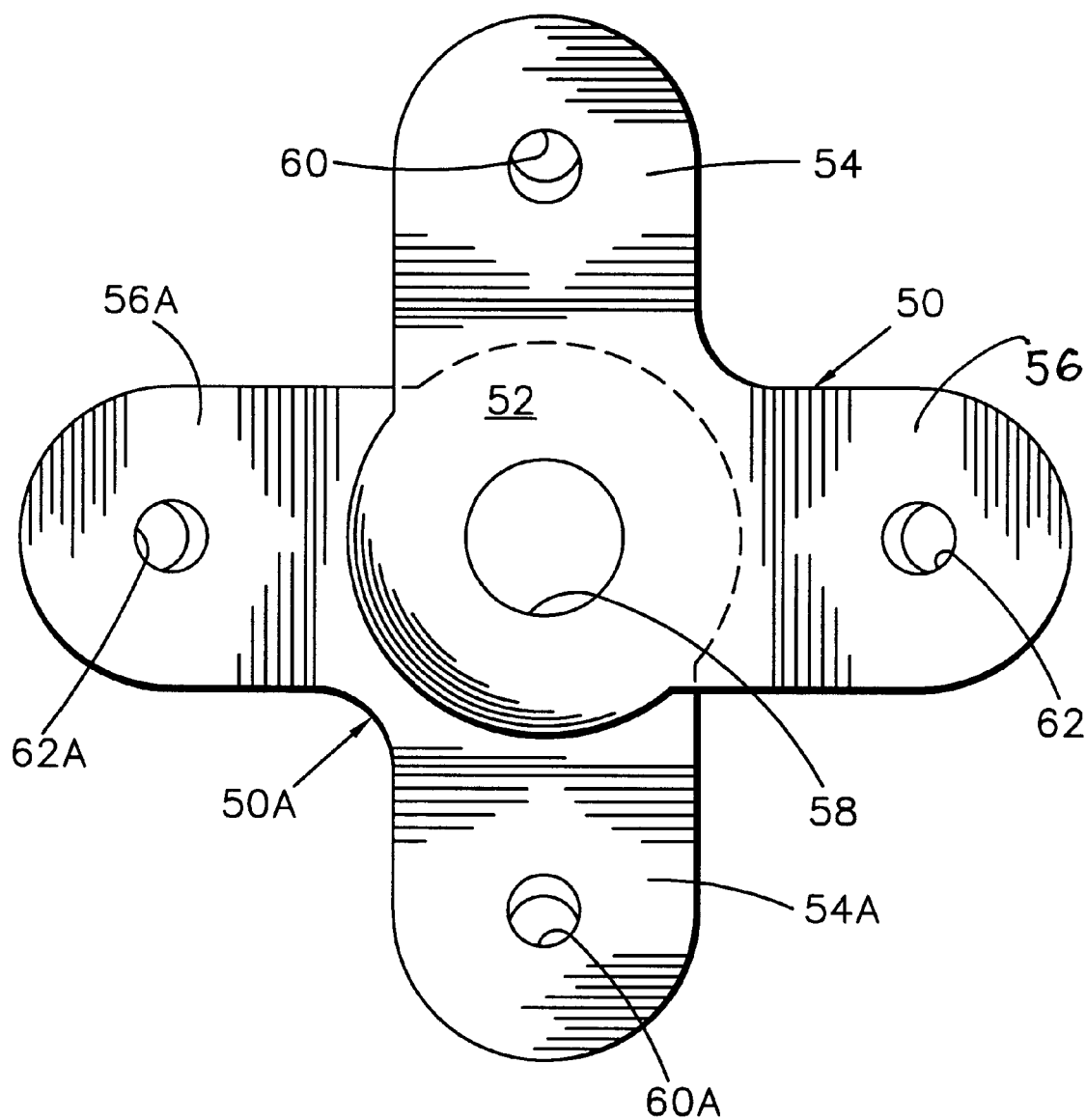

FIG. 4 is a top plan view of a preferred embodiment of the universal restraint bracket of this invention generally illustrating its L-shaped configuration;

FIG. 5 is a perspective view of the bracket of FIG. 4 showing elevated wing portions of the bracket; and FIG. 6 is a top plan view of two of the brackets of FIG. 4 in nested or stacked relation to one another.

DETAILED DESCRIPTION OF A PREFERRED EMBODIMENT OF THE INVENTION

Figure 1A:
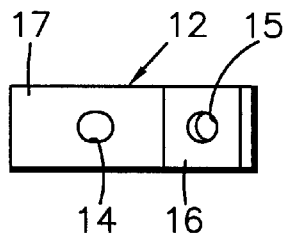
FIG. 1A is a top plan view of a prior art bracket, such as that shown in FIG. 1, without cable attachment.

Before examining the details of the present invention, it is believed helpful to an understanding the present invention if the nature and status of typical prior art relating to shock bracing, particularly seismic shock bracing, are examined. Consideration of the prior art shown in the drawings is believed essential to an understanding of the problems solved by the present invention. Sway bracing systems to control object sway under, for example, seismic shock conditions have resulted in the preferred prior art use of tensioned cable systems to provide lateral and longitudinal or four-way tensioned cable sway control. Certain fundamental cable concepts have been drawn from the prior art, particularly the marine field, and a fundamental unit is found in FIGS. 1 and 1A. Threaded fastener 10 extends through a suitable washer 11 and bracket 12 having an aperture 14. Bracket 12 may be secured to an object whose sway is to be controlled or to the support structure (not shown) by fastener 10. Cable 18 is of any suitable length and may have brackets such as at 12 at each cable end. Bracket 12 (see particularly FIG. 1A) is provided with an upwardly extending leg or wing 16 from a flat portion 17 of bracket 12. Wing 16 is provided with a suitable aperture 15 to accept cable 18 having a free end wrapped about a thimble 20 extending through aperture 15 with the cable end 22 being trained about thimble 20 and secured to the main cable portion by a suitable crimped fitting 24. This basic structure is a fundamental arrangement for tension sway bracing in the prior art.

Figure 1:
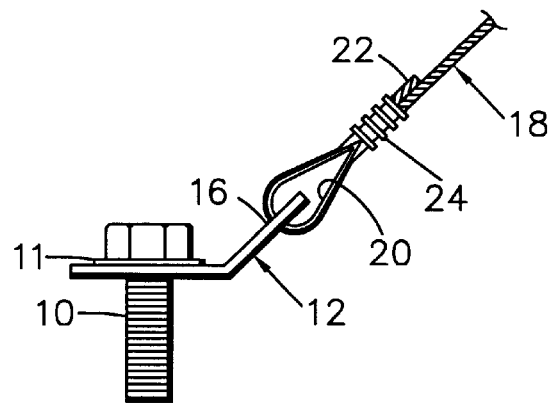
FIG. 1 is an elevational view showing a portion of a cable attached to a prior art bracket which bracket is centrally apertured to receive a threaded fastener and has an upwardly bent portion to receive a thimble and cable.
Figure 2:
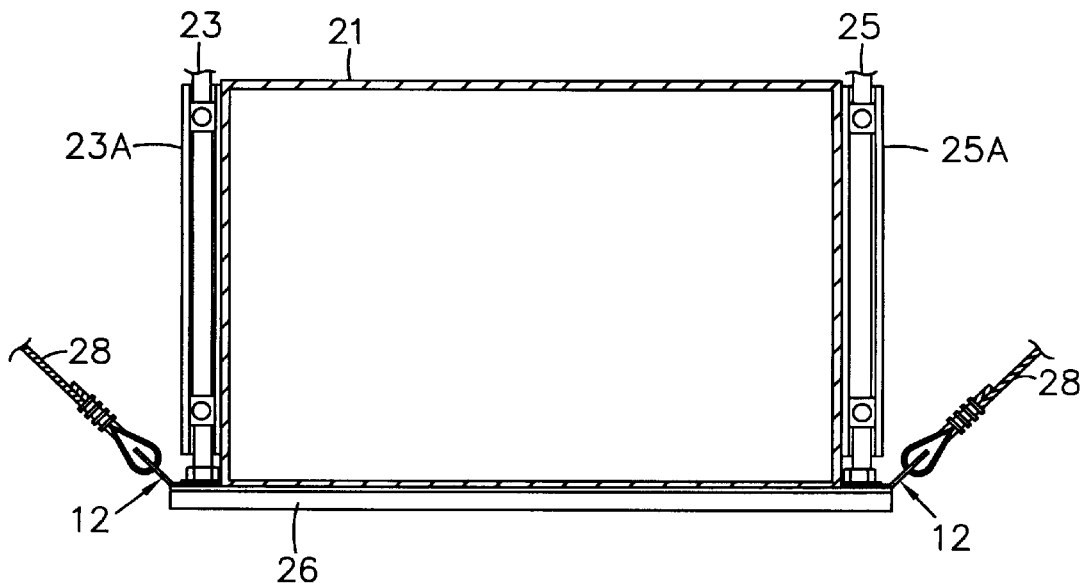
FIG. 2 is a prior art illustration of typical HVAC duct in cross-section, partly broken away, showing lateral bracing.

Turning next to FIG. 2, it is seen that typical HVAC duct work 21 (shown in cross section) is supported by suitable rods 23 and 25 shown within rod stiffeners 23A and 25A. The rods extend to and engage bottom object support 26, it being understood that rods 23,25 are fixed at their upper ends, not shown, to a support structure such as a building or structural element. A cable 28 of the type shown in FIG. 1 is attached to bottom support 26 by brackets 12 at each of its ends with opposite ends (not shown) of each cable 28,28 secured to the support structure. Such an arrangement is intended for transverse or lateral sway bracing by the cables under tension.

Figure 2A:
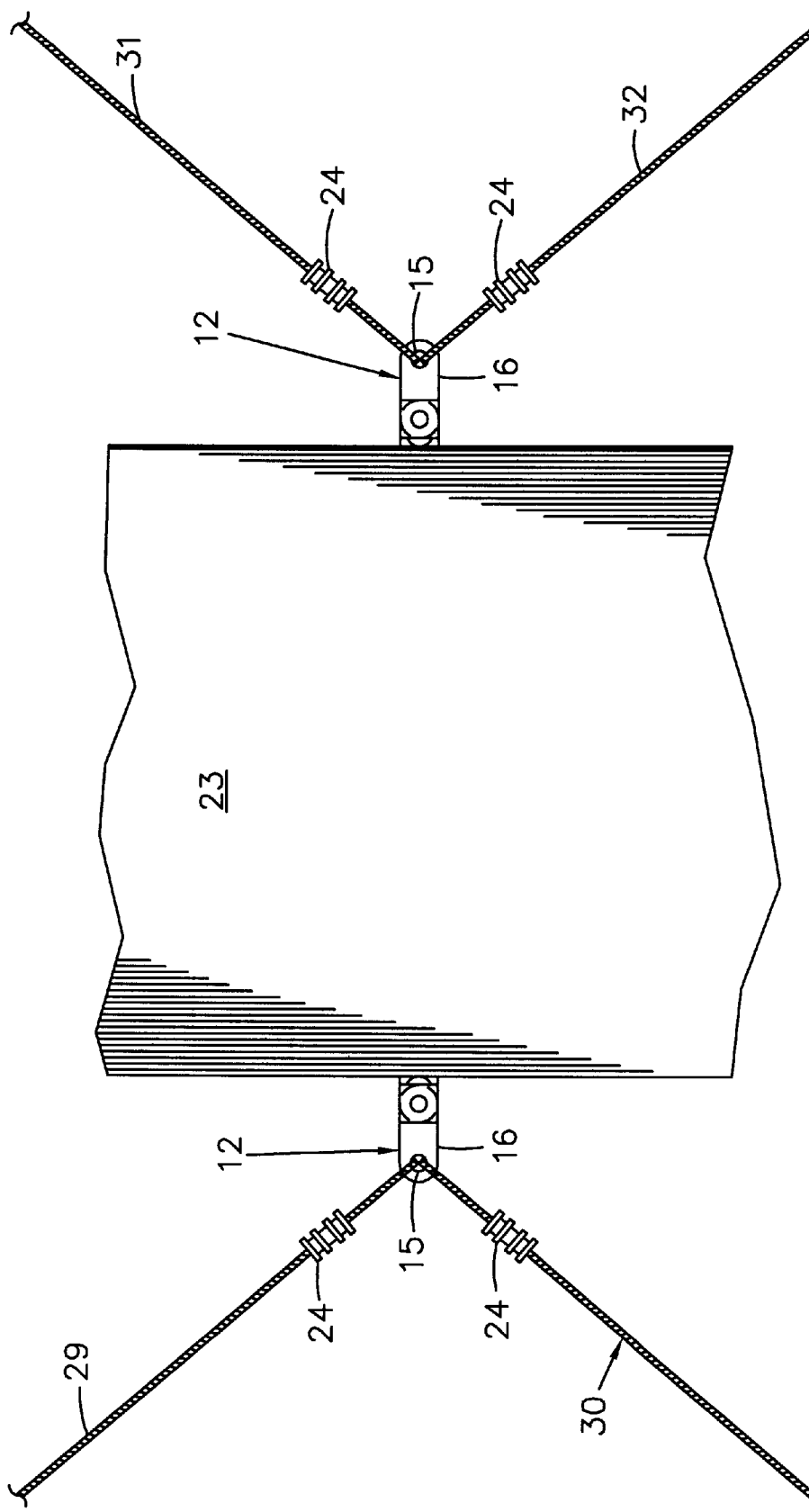
FIG. 2A shows a top plan view of the HVAC duct of FIG. 2 with longitudinal and lateral sway protection typically provided by the prior art using a single apertured bracket affixed to the mounting for the HVAC duct and with suitable cabling connected to walls, ceiling or the like (not shown)

FIG. 2A shows a modified form of prior art sway bracing utilizing the bracket 12 of FIG. 1 wherein the duct work 23 (shown in top plan view) is supported as in FIG. 2 and is braced by two pairs of cables 29, 30 and 31, 32. Each cable pair 29, 30 and 31, 32 is secured to a wing 16 of its respective bracket 12. Such an arrangement provides both lateral and longitudinal bracing for object support member 26 and hence for the HVAC duct 23. Each cable extends through aperture 15 of its bracket 12 with a suitable thimble (not shown) and crimped fitting 24 provided as in FIG. 1.

Figure 3:
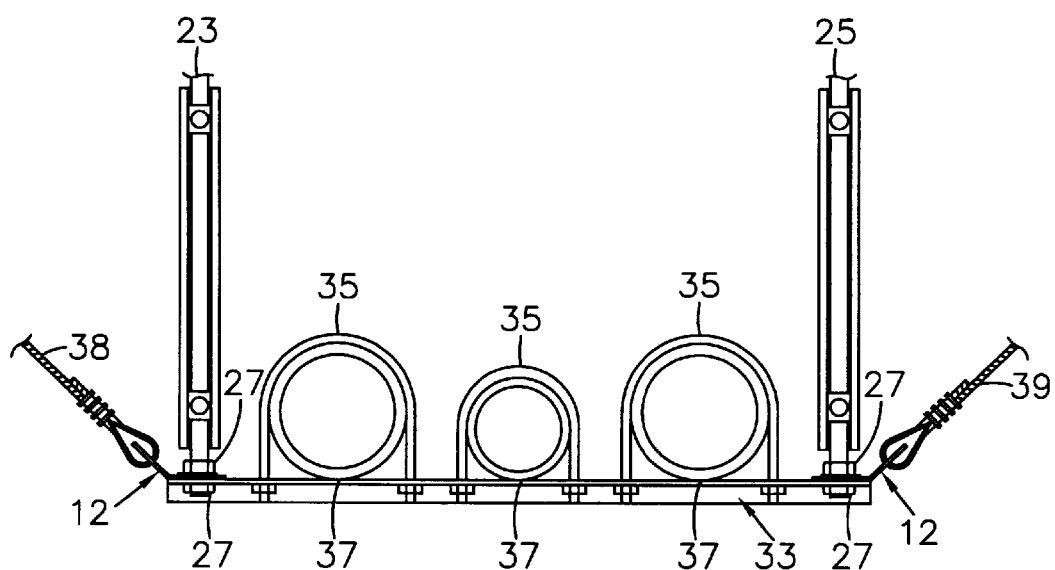
FIG. 3 is a cross sectional view of an assembly, partly broken away, showing piping or conduit which may transmit water, gases or the like supported on a hanger and which are sway protected by cable devices extending from suitable prior art brackets engaging the hanger with cable extending to a stabilizing structure (not shown)

Turning next to FIG. 3, there is seen a partial cross sectional view of a suitable hanger structure having rods 23 and 25 secured at upper ends to an overhead support structure (not shown) and secured at their lower threaded ends by nuts such as at 27 to a support member 33 to which suitable U clamps 35 are secured to hold piping or electrical duct work 37 in position. Cable assemblies 38, 39 similar to those shown in FIGS. 1 and 2 are secured to opposite ends of the support member 33 through suitable brackets 12,12 to provide lateral sway bracing, the cables 38 and 39 being secured to a support structure, not shown, as desired.

FIG. 3A is a top plan view of an assembly slightly modified from that shown in FIG. 3 wherein conduit or the like 37 is supported on support member 33 by U clamps 35. The sway bracing is accomplished, however, by providing pairs of cables 40, 41 and 42, 43 which are each secured to support member 33 through a pair of apertured brackets 12 (with the usual thimble and fitting 24) and arranged such that the cables are secured to a support structure (not shown) to provide both horizontal and lateral sway protection because of the illustrated angular relationship of the cables.

In each of the foregoing prior art examples, a single clip or bracket 12 is utilized to affix a cable to the object to be braced. A single aperture is provided in the bracket to accept one or more cable ends, and the resulting stresses imposed on brackets 12 by plural cable bracing techniques creates structural load points of reduced strength to resist the bracing loads, e.g., under a typical seismic sway load situation.

FIG. 3B shows a pair of single clips or brackets 12A, 12B arranged with flat portion 17A of clip 12A overlying the corresponding flat portion 17B with their apertures (such as 14A) registering with one another. Legs 16A, 16B of clips 12A, 12B extend at a 90° angular displacement to one another. It is to be understood that the stacked double clip prior art arrangement of FIG. 3B is preferred to be substituted for the single clip shown in FIGS. 2,2A and 3,3A so as to have one clip for each cable end such as at 42,43 trained through each aperture 15A,15B. Forces applied upon loading of the cable such as at 42, for example, then minimize any tendency of the clip 12A to rotate about the bolt (not shown) extending through the registering apertures such as at 14A.

Turning now to the support bracket of this invention, it is seen in FIGS. 4 and 5 that a generally L shaped bracket 50 is provided, bracket 50 having a central flat base or hub 52 and a pair of angularly disposed wings 54 and 56. The central aperture 58 is provided for securing a bracket 50 to either a support structure or to the object to be sway braced, and suitable apertures 60 and 62 are provided in wings 54 and 56 for attachment of a cable and end fittings such as is used in the prior art.

It will be appreciated that there is only a single cable attached to each wing so as to better distribute the load and by virtue of the disclosed angular relationship of the wings 54,56, reduce stresses. As best seen in FIG. 5, wings 54 and 56 are upwardly bent away from the central flat portion or base 52 for optimal cable attachment. The bracket 50 is typically manufactured in bolt hole sizes to accommodate ¼ inch through 1¼ inch bolts. The cable attachment wings 54,56 are normally capable of receiving size 12, size 18 or size 36 seismic wire rope/cable bracing. Moreover, to minimize undesired prying action of the bracket 50 when it is attached to a support structure and under stress, the cable apertures 60,62 are designed to be closer to the central bolt aperture 58 than in the prior art single clip.

To provide the availability of a plurality of types of cable sway bracing (including lateral and longitudinal or four-way), an installer of sway bracing structure needs only a supply of brackets of this invention for attachment of cable earthquake sway bracing in multiple sway brace configurations without changing the bracket. The bracket shown in FIGS. 4 and 5 is constructed so that the main mounting hole 58 can be used with only a single sway bracing cable secured to the aperture 60 in its one wing 54 or, if desired and as seen in the drawings, wing 56 projects at about a 90° angle relative to wing 54 and is provided with an additional aperture 62 to accept an additional sway bracing cable. Thimbles and cables, with properly crimped fittings, are to be understood to be used to extend from the aperture 60 and 62 in each wing 54 and 56 to a support structure surface with but one cable preferably secured to each wing.

By forming brackets 50 of a material softer than the steel wire cable, the thimble may be dispensed with and an installer then may crimp an oval sleeve at any desired point along the cable. It will be appreciated by those skilled in the art that the universal restraint bracket of this invention is significantly lighter, smaller and less expensive to make than two single clips. These advantages are further amplified by providing for easier field installation at either a support structure or suspended component. In addition, a single universal restraint bracket 50 is particularly convenient in certain applications using bolts, e.g., of a given length which are too short to accommodate double stacked single clip arrangements.

By virtue of the disclosed structure, multiple brackets of the type illustrated in FIGS. 4 and 5, because of the bracket heft, can be nested or stacked in offset relation (FIG. 6) to one another about their central aperture 58 for those situations when the sway bracing desired involves more than two cables. It is cautioned, however, that when the brackets are stacked to accommodate additional cable to be used in sway bracing, the fastener 10 must be adequate to resist the shear loads which will be applied. For example, two brackets 50,50A nested as shown in FIG. 6 can be stacked on hanger rods as clevis rings for attachment of four aircraft cables (not shown) as needed for 4-way earthquake sway brace assemblies. The universal restraint bracket or clip 50 of this invention accordingly can be used with two such brackets in stacked relation on a member to be braced by four cables extending out from apertures 60,62 and 60A, 62A to structural members each using one such bracket 50 for the opposite end of each cable.

Although this invention has been illustrated and described with respect to an exemplary embodiment thereof, it should be understood by those skilled in the art that various changes, omissions and additions may be made without departing from the spirit and scope of the invention.

What is claimed is:

1. A universal one piece restraint bracket in a cable sway bracing system for selective attachment to a structural element mounting surface and to a mounting surface of an object braced to reduce sway damage and comprising a planar base having an aperture therethrough to receive a mounting fastener for attachment to a mounting surface;

first and second wing portions integrally formed with the base;

the wing portions extending away from the base in generally perpendicular relation to one another and cooperating with the base to jointly form a generally L-shaped member of unitary configuration, the wing portions each being bent upwardly from the base at an angle to the plane of the base, the wing portions each having an aperture therethrough, such that line projections from the aperture of the base to each wing aperture intersect at the aperture of the base at about a 90° angle.

2. The universal restraint bracket of claim 1 wherein each of the wing portions are bent upwardly from the base at about a 45° angle to the plane of the base.

3. A universal restraint device for use in a cable sway bracing system for selective attachment to a structural element mounting surface and to a mounting surface of an object being braced to reduce sway damage and comprising a first restraint bracket having a planar apertured base intended to engage a mounting surface and to be secured thereto by a suitable fastening means extending through the apertured base;

a first wing member extending away from the apertured base at an angle of approximately 45° to the plane of the apertured base, the first wing member being apertured to receive cable fastening means; and a second wing member extending away from the apertured base at an angle of approximately 45° to the plane of the apertured base, the second wing member being apertured to receive cable fastening means;

the apertured base, the first wing member and the second wing member being of unitary configuration; and a second restraint bracket identical in configuration to the first restraint bracket, the second bracket being in nested relation to the first bracket, the first and second brackets having base apertures in aligned registration to be secured to the mounting surface by a common fastening means, the first wing member and second wing member of each bracket being disposed in spaced relation to the corresponding wing members of the other bracket to provide four apertured wing members in angularly spaced relation to one another about the base apertures of the brackets.

* * * * *